UNITED STATES PATENT OFFICE.

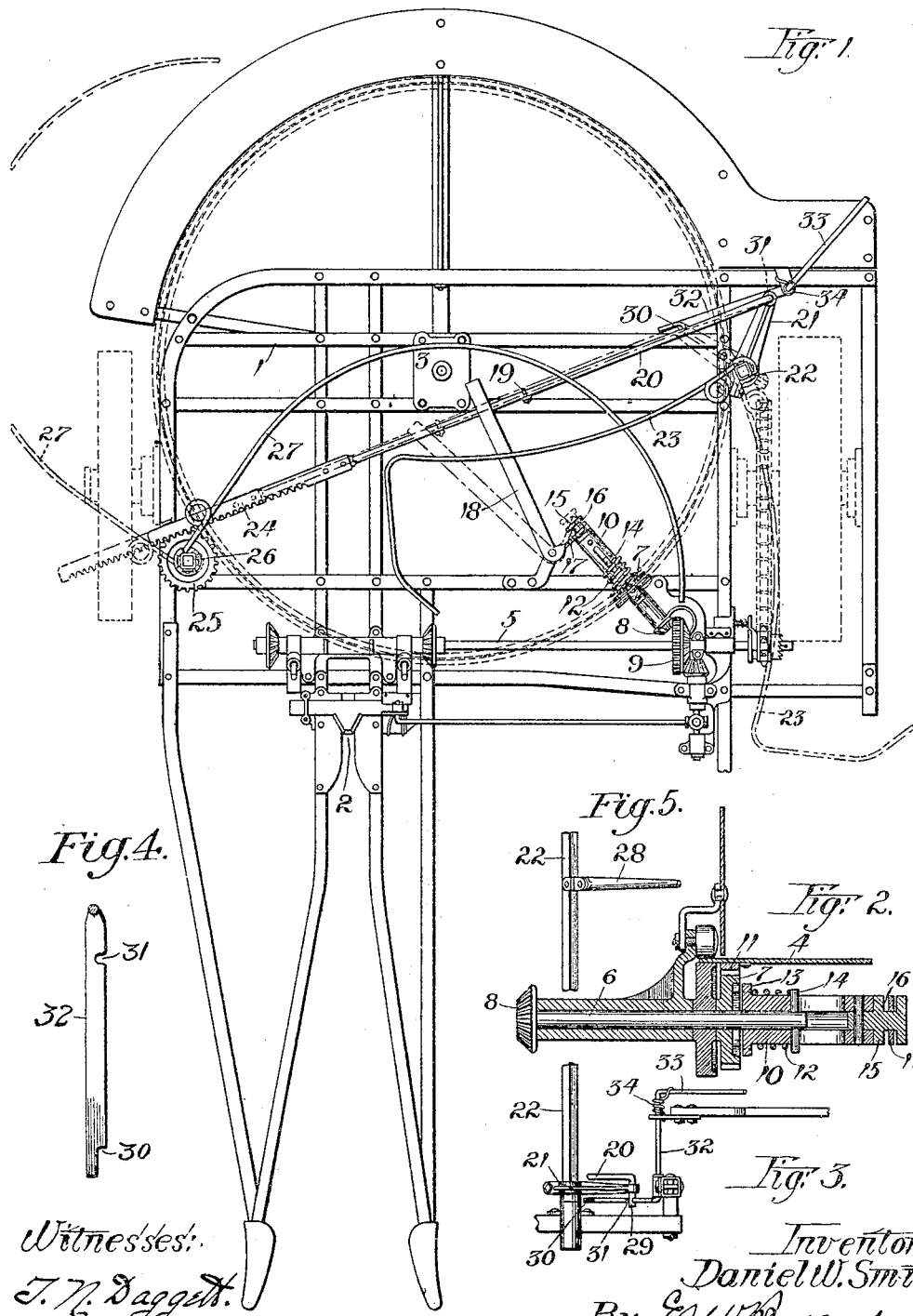

DANIEL W. SMITH, OF CHICAGO, ILLINOIS, ASSIGNOR TO INTERNATIONAL HARVESTER COMPANY, A CORPORATION OF NEW JERSEY.

CORN-SHOCKING MACHINE.

No. 800,504.   Specification of Letters Patent.   Patented Sept. 26, 1905.

Application filed June 17, 1905. Serial No. 265,665.

*To all whom it may concern:*

Be it known that I, DANIEL W. SMITH, a citizen of the United States, residing at Chicago, in the county of Cook and State of Illinois, have invented certain new and useful Improvements in Corn-Shocking Machines, of which the following is a specification, reference being had to the accompanying drawings, forming a part thereof.

My invention relates to corn-shocking machines of that class having a cutting apparatus and a rotatable platform in rear thereof upon which the cut stalks are formed into a shock as they are received from the cutting mechanism, the shock-forming means comprising compressing spring-arms mounted upon vertically-disposed rotatable posts arranged at opposite sides of the rotatable platform; and it consists in improved means for locking said rotatable posts in operative position and for simultaneously rotating said posts to release the pressure of the compressing-springs and unshipping the clutch mechanism forming part of the power-transmitting means connecting the source of power with the rotatable platform, the objects of the invention being to provide a mechanism for controlling said parts that will be more positive in its action and also one that will automatically arrest the rotatable movement of the platform when the compression-springs are released preparatory to depositing the shock upon the ground. I attain these objects by the mechanism illustrated in the accompanying drawings, in which—

Figure 1 is a plan view of a part of a corn-shocking machine embodying my invention. Fig. 2 is a sectional detail of the gear connection and clutch mechanism connected with the rotatable platform. Figs. 3 and 4 are details of the locking means connected with the compressing-spring standards, and Fig. 5 represents a portion of one of the rotating standards with hand-lever attached thereto.

Similar characters refer to similar parts throughout the several views.

1 represents the wheel-frame of the machine; 2, the cutting apparatus; 3, a bearing-plate secured to the wheel-frame and adapted to support a rotatable platform 4. (Shown only in part in Fig. 2.)

5 is a cross-shaft suitably mounted upon the wheel-frame deriving motion from the source of power in a well-known way and transmitting it to the other operative parts of the machine, including the rotatable platform, which derives its motion therefrom by means of the shaft 6 and gear-wheels 7, 8, and 9 in a well-known way. It has been the usual practice in this class of machines to have the shock-receiving platform rotate continuously when the cutting apparatus and other parts were being operated. This has been found objectionable, particularly when means for hoisting the shock have been connected with the power-transmitting means, the rotatable platform requiring considerable power to give it motion, which power is utilized to raise the shock when the movement of the rotatable platform is arrested as by my invention. To attain this object, I provide the shaft 6 with a common form of clutch mechanism comprising a movable clutch member 10, adapted to engage with the gear-wheel 7, that meshes with a gear-surface 11, secured to the rotatable platform 4. The clutch member 10 is moved to engage with the gear-wheel by means of the coiled spring 12, operative between a portion 13 on the movable clutch member and a pin 14 through the shaft 6. Secured to the part 10 is a part 15, having a groove 16, and engaging therewith is one arm 17 of a bell-crank-lever 18, pivotally mounted upon the wheel-frame of the machine, the opposite end of which engages with a stop-block 19, secured to a reciprocating bar 20, pivotally connected at one end to a lever 21, secured to a rotating standard 22, to which are attached compressing spring-arms 23 upon one side of the machine, the opposite end of said reciprocating bar being provided with a toothed rack 24, that meshes with a pinion 25, secured to a rotating standard 26, mounted upon the opposite side of the machine and to which are secured compressing-springs 27. A hand-lever 28 is secured to the rotating standard 22 for the purpose of returning it to operative position with the compressing-springs in position to receive the incoming stalks. The reciprocating bar 20 is provided with a downturned end 29 at right angles with its body portion, as shown in Fig. 3, that projects through the end of the lever 21 and is adapted to engage with notches 30 and 31 in a latch-piece 32, pivotally mounted on the wheel-frame and having a hand-lever 33, forming a part thereof, and 34 is a coiled spring surrounding the pivot and operative between the lever and a fixed part of the frame to hold the latch-piece in contact with the end of the reciprocating bar. When the shock is being formed, the compressing-springs are gradually forced outward until they assume a position approximately concentric with the periphery of the rotatable platform, the standards 22 and 26 being prevented from rotating by the locking means already described. When the shock has been completed and ready to be deposited upon the ground, the operator by means of the hand-lever 33 releases the latch-piece 32 from contact with the reciprocating bar, and the reactionary force of the spring-compressing arms will immediately rotate the standards, and thereby move the bar 20, and the stop-block 19, coming in contact with the shipping-lever 18, disengages the clutch mechanism and the rotatable movement of the platform is arrested until by means of the hand-lever 28 the standards and compressing-springs are again adjusted to operative positions.

What I claim, and desire to secure by Letters Patent, is—

1. In a corn-shocking machine, the combination of a shock-forming platform, rotatable standards mounted upon opposite sides thereof, compressing-springs secured to said standards, and means for simultaneously rotating said standards comprising a lever secured to one standard, a pinion secured to the opposite standard, a reciprocating bar having a toothed rack at one end engaging with said pinion and having pivotal connection at its opposite end with said lever.

2. In a corn-shocking machine, the combination of a shock-forming platform, rotatable standards mounted upon opposite sides thereof, compressing-springs secured to said standards, and means for simultaneously rotating said standards comprising a lever secured to one standard, a pinion secured to the opposite standard, a reciprocating bar having a toothed rack at one end engaging with said pinion and having pivotal connection at its opposite end with said lever, and a pivotally-mounted latch-piece adapted to lock said bar at either extremity of its movement.

3. In a corn-shocking machine, the combination of a shock-forming platform, rotatable standards mounted upon opposite sides thereof, compressing-springs secured to said standards, and means for simultaneously rotating said standards comprising a lever secured to one standard, a pinion secured to the opposite standard, a reciprocating bar having a toothed rack at one end engaging with said pinion and having pivotal connection at its opposite end with said lever, and a pivotally-mounted latch-piece having notches therein adapted to engage with the end of said bar in a manner to lock it at either extremity of its movement.

4. In a corn-shocking machine, the combination of a shock-forming platform, means for rotating said platform comprising power-transmitting means connecting it with a source of power, a clutch mechanism and a clutch-shipping lever forming part of said power-transmitting means, rotatable standards mounted upon opposite sides of the shock-forming platform, means for simultaneously rotating said standards comprising a reciprocating bar connected therewith, said reciprocating bar contacting with said shipping-lever to disengage said clutch mechanism when moved in one direction.

5. In a corn-shocking machine, the combination of a shock-forming platform, means for rotating said platform comprising power-transmitting means connecting it with a source of power, a clutch mechanism and a clutch-shipping lever forming part of said power-transmitting means, rotatable standards mounted upon opposite sides of the shock-forming platform, means for simultaneously rotating said standards comprising a reciprocating bar connected therewith, said reciprocating bar having a stop-block secured thereto and adapted to contact with said shipping-lever and move it in a manner to disengage said clutch mechanism when said bar is moved in one direction.

6. In a corn-shocking machine, the combination of a shock-forming platform, means for rotating said platform comprising power-transmitting means connecting it with a source of power, a clutch mechanism and a clutch-shipping lever forming part of said power-transmitting means, rotatable standards mounted upon opposite sides of the shock-forming platform, means for simultaneously rotating said standards comprising a reciprocating bar connected therewith, said reciprocating bar having an adjustable stop-block secured thereto and adapted to contact with said clutch-shipping lever and move it in a manner to disengage said clutch mechanism when said bar is moved in one direction.

7. In a corn-shocking machine, the combination of a wheel-frame, a rotatable shock-forming platform mounted thereon, a cross-shaft suitably journaled in bearings mounted upon said wheel-frame, means for driving said cross-shaft, a shaft deriving motion from said cross-shaft and having a pinion mounted thereon that is operatively connected with said rotatable platform, a slidable clutch member mounted on said second-named shaft and adapted to engage with said pinion, a spring operative to hold said parts in engagement, a two-armed clutch-shipping lever pivotally mounted upon said wheel-frame and engaging with said slidable clutch member in a manner to disengage it from the pinion, rotatable standards mounted upon opposite sides of the shock-forming platform, means for simultaneously rotating said standards comprising a reciprocating bar connected therewith, said bar having a stop-block secured thereto and adapted to contact with one arm of said clutch-shipping lever and move it in a direction to disengage the clutch members when said bar is moved in one direction.

In witness whereof I hereto affix my signature in presence of two witnesses.

DANIEL W. SMITH.

Witnesses:
   GEO. W. HENDERSON,
   ERLE L. HARCOURT.